Nov. 16, 1948.    E. L. HARDER ET AL    2,454,165
REGULATING SYSTEM
Filed Nov. 29, 1945
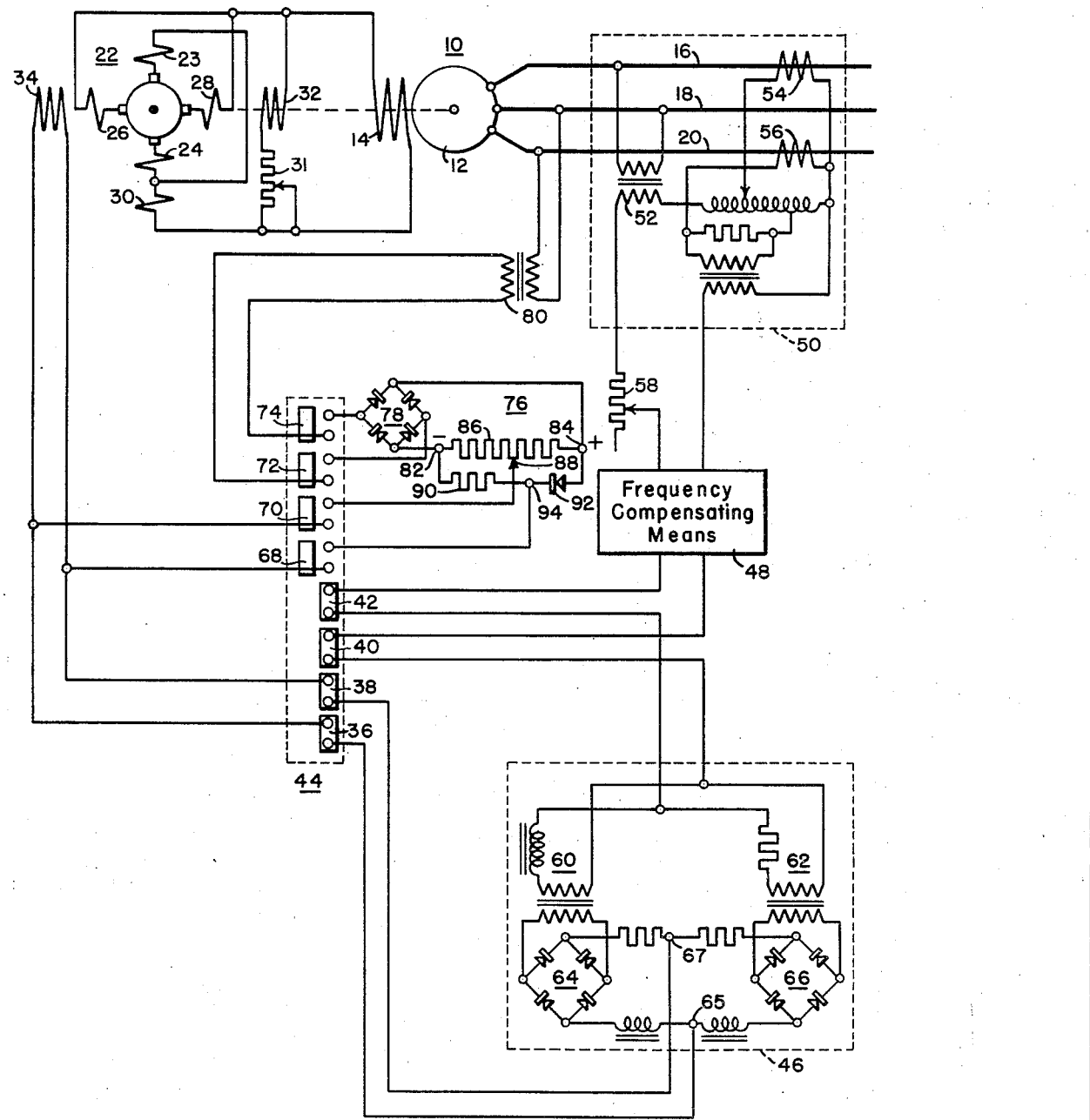
INVENTORS
Edwin L. Harder and
Ernest I. Pollard.
BY
James N. Ely
ATTORNEY Patented Nov. 16, 1948

2,454,165

UNITED STATES PATENT OFFICE 2,454,165

REGULATING SYSTEM

Edwin L. Harder, Pittsburgh, and Ernest I. Pollard, Wilkinsburg, Pa., assignors to Westinghouse Electric Corporation, East Pittsburgh, Pa., a corporation of Pennsylvania Application November 29, 1945, Serial No. 631,725

2 Claims. (Cl. 322—77)

1

This invention relates to regulating systems.

Regulating systems which utilize conventional exciters for controlling the excitation of generators have been known for many years. The conventional exciters are designed to have a saturation curve such that saturation starts at a point below the lowest normal operating point on the curve in order to permit a stable manual control of the exciter. This is readily accomplished, for with a hand controlled rheostat adjusted in a predetermined manner and connected in the field circuit of the exciter, it is found that the resultant field circuit resistance line provides a definite intersection at a point along the exciter saturation curve and that the exciter voltage is at a value corresponding to the point of intersection. Such manual control is stable in that, if the voltage of the exciter tends to rise, the increase is insufficient to produce enough field current to sustain the higher value; whereas, if the voltage tends to decrease, the field current of the exciter is excessive and functions to restore the voltage to a value corresponding to the point of intersection referred to hereinbefore.

Recently there has been developed a self-excited or "series tuned" exciter which normally operates along the linear part of its saturation curve. Such exciters have a series field winding for normally supplying the majority of the excitation requirements with a shunt field for supplying the remainder of the excitation of the machine and at least one control field winding disposed to be directionally energized in response to the operation of a generator, the excitation of which is controlled by the exciter. As the self-excited exciter operates on the linear part of its saturation curve, it can not be successfully manually controlled by a rheostat in series with a shunt field but instead, if such a manual control is utilized, it is found to be extremely unstable. This becomes evident when it is considered that the field circuit resistance line for the self-excited exciter coincides with the air-gap line of the exciter throughout the linear part of the saturation curve, and that the same rheostat setting is required for all voltages from zero up to the saturation point. Thus, as the voltage of the exciter tends to change, the field current changes just the right amount to support the changed voltage and there is no tendency to apply a restoring force to correct the change in voltage.

In connection with the self-excited exciter referred to, there has recently been developed a manual control circuit, as disclosed in application Serial No. 631,726, filed November 29, 1945, in the name of E. L. Harder et al., for controlling the directional energization of a control field winding of the exciter. The system disclosed therein restricts regulating action so that the return of the exciter voltage to normal is slow

2 enough to permit a circuit breaker coordination and, in conjunction with the characteristics of the self-energizing exciter, restricts the voltage drop occurring when suddenly applied loads are encountered to only the transient drop for a long enough period of time to permit the operator to manually operate the control circuit to restore normal voltage. While the system described and claimed therein provides a slow drift of the exciter voltage to its preset value after a fault or sudden load is encountered, it is found that the drift of the exciter voltage is in a direction to restore the generator voltage to a value below the normal predetermined value by an amount equal to the synchronous reactance drop instead of to the normal predetermined value.

An object of this invention is the provision of a regulating system for automatically effecting a slow correction in the excitation of a self-energizing exciter in a direction to restore generator voltage to a normal predetermined value when sudden loads are applied thereto.

Another object of this invention is to provide in a regulating system which utilizes a self-excited exciter for controlling the excitation of a generator, for a manual control system operative when a sudden load is applied to the generator for automatically effecting a slow correction in the excitation of the exciter to tend to restore the generator voltage to normal, the manual control system being adjustable to effect forcing of the excitation of the exciter.

Other objects of this invention will become apparent from the following description, when taken in conjunction with the accompanying drawing in which the single figure is a diagrammatic representation of a regulating system embodying the teachings of this invention.

Referring to the drawing, there is illustrated a generator 10 the voltage of which is to be regulated. The generator 10 comprises the armature windings 12 and the field windings 14, the armature windings 12 being connected for supplying a three-phase load circuit represented by conductors 16, 18 and 20. The field windings 14 are connected to be supplied from a rotary direct-current generator or self-excited exciter 22.

The self-excited exciter 22 schematically represented is of 4-pole construction having a plurality of field windings and is of the general construction and type disclosed and claimed in the copending application Serial No. 607,440, filed July 27, 1945, in the name of W. R. Harding and A. W. Kimball, and assigned to the assignee of this invention. As disclosed therein, the exciter or rotary direct-current generator 22 has a number of pole pieces and an equal number of commutator brushes arranged to assume sequentially positive and negative electrical potentials. In the embodiment schematically shown in the drawing, the positive brushes of the 4-pole machine are interconnected by an equalizing connection as are also the negative brushes of the machine.

The exciter generator 22 is provided with forcing fields 23 and 24 connected in series-circuit relation in one of the equalizing connections, the fields 23 and 24 being so divided as to constitute two groups of four windings each, a corresponding winding from each group being arranged on each of the four poles to be equally and sequentially excited by current flowing between the brushes. In addition to the forcing fields 23 and 24, the exciter generator 22 is also provided with compensating windings 26 and 28 disposed on two of the poles and self-sustaining or exciting field windings 30 and 32 which are so divided and positioned on all of the poles that the flux distribution of the self-excitation is symmetrical.

The field windings 30 are connected in series in the load circuit, whereas the field windings 32 are connected in shunt across the load circuit for the exciter generator 22, a calibrating resistance 31 being connected in series with the shunt fields. The series and shunt field windings of the exciter generator 22 may be cumulative with the series field windings 30 providing slightly less than required sustaining field strength and the shunt field 32 being only strong enough for adjusting to full self-excitation field strength to compensate for manufacturing differences and installation adjustment or the like. On the other hand, the shunt field windings 32 may be wound to oppose the series field windings 30 where the windings 30 supply slightly more than required sustaining field strength.

The series tuned exciter generator 22 is also provided with a control field winding 34 so wound as to provide equal windings on two of the poles to increase the strength of one while decreasing the strength of the other when energized to distort the flux distribution in the field structure in a degree depending upon the energization of the control field winding. By utilizing the control field winding 34 in the exciter generator 22, the plurality of field windings cooperate in the single machine, as disclosed in the Harding et al. application Serial No. 607,440, identified hereinbefore, to give an extremely sensitive and quick response of generated voltage to changes of a comparatively weak input voltage while at the same time giving a high amplification ratio.

The control field winding 34 which is disposed to be normally deenergized when the generator 10 is operating to maintain a predetermined line voltage and to be directionally energized as the line voltage increases or decreases from the predetermined value under automatic regulation as described hereinafter to so control the exciter generator 22 as to correct the excitation of the generator 10 to correct for such departure and maintain the line voltage substantially at the predetermined value.

As illustrated, the control field winding 34 is disposed to be connected through segments 36, 38, 40 and 42 of a controller 44, a voltage reference network 46 and a frequency compensating means 48 to be supplied by the line voltage, a network 50 being utilized to derive a positive sequence component of the line voltage for supplying a measure of the line voltage.

The network 50 for deriving the positive sequence component of the line voltage is disclosed and claimed in the copending application of E. L. Harder, Serial No. 560,299, filed October 25, 1944, now Patent 2,426,013, issued August 19, 1947. Briefly, the network comprises the potential transformer 52 for deriving a single phase of the three-phase line voltage having no zero-sequence voltage-component and current transformers 54 and 56 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component to the line voltage. Other embodiments of the positive-sequence component network 50 are disclosed and claimed in the aforementioned application Serial No. 560,299, and may be employed instead of the specific network 50 illustrated in the drawing.

An adjustable resistor 58 is connected in the output circuit from the network 50 for providing a voltage adjusting means. The frequency compensating means 48 may be any suitable arrangement of capacitors and inductance apparatus for accomplishing the purpose of compensating for frequency. As will be appreciated, in many cases the frequency of the line voltage will not fluctuate greatly, and it may not be necessary to utilize the compensating means 48, but instead the positive-sequence component of the line voltage from the network 50 will be supplied directly to the voltage reference network 46.

The voltage reference network 46 illustrated is disclosed in detail in the copending application Serial No. 567,256, filed December 8, 1944, of E. L. Harder et al., now Patent 2,428,566, issued October 7, 1947, and briefly comprises a non-linear impedance circuit 60 and a linear impedance circuit 62 connected to be simultaneously energized in accordance with the line voltage and, in particular, by the positive-sequence component of the line voltage. The non-linear impedance circuit 60 and the linear impedance circuit 62 are connected through insulating transformers across rectifying units 64 and 66, respectively, the output terminals of the rectifying units being connected in series-circuit relation with each other through suitable series-connected resistors and series-connected smoothing reactors. The control-field winding 34 of the exciter 22 is disposed to be connected through segments 36 and 38 across the direct-current series circuit connecting the rectifying units at points 65 and 67, respectively, which for the predetermined line voltage are at zero potential. The elements of the non-linear impedance circuit 60 and of the linear impedance circuit 62 have intersecting impedance characteristics and, as the line voltage fluctuates from the predetermined value, the current drawn by the circuits varies with the result that an unbalanced condition between the output of the rectifying units occurs and the control field winding 34 is energized in one or the other directions depending upon the direction of the unbalanced condition.

The controller 44 is also provided with segments 68, 70, 72 and 74 disposed to be actuated to a circuit closing position when segments 36, 38, 40 and 42 are actuated to a circuit opening position to connect the controller field winding 34 to be energized from a manual control circuit 76 which is disposed to be supplied with unidirectional current from rectifying bridge 78 which is disposed to be connected by segments 72 and 74 through transformer 80 to be supplied from the load conductors 18 and 20.

The manual control circuit 76 comprises two parallel circuits connected between common taps or terminals 82 and 84 which are, in turn, connected to the output terminals of the rectifying bridge 78. One of the parallel circuits comprises a resistor 86 having an intermediate adjustable tap 88; and the other of the parallel circuits comprises a resistor 90 and a dry-type rectifier 92, such as a copper-oxide rectifier, connected in series-circuit relation through an intermediate fixed tap 94. The control-field winding 34 of the exciter generator 22 is connected through segments 68 and 70 to taps 94 and 88, respectively.

For the purpose of better understanding the operation of the manual control circuit 76, as will be described hereinafter, the dry-type rectifier 92 may be considered as a battery in that the forward potential drop across the rectifier is substantially constant as the current through the rectifier changes, and the rectifier 92 may, therefore, be considered as a substantially constant potential device. The constant potential or non-linear impedance characteristic of the rectifier is the characteristic primarily employed in the manual control circuit instead of the rectifying characteristic.

In operation with the controller 44 in the position illustrated, and assuming that the generator 10 and self-excited and tuned exciter generator 22 are being driven by some suitable means (not shown) for supplying power at a constant voltage to a load (not shown), the windings 30 and 32 of the exciter generator 22 are sufficient for normally maintaining the excitation of the generator 10 to maintain constant voltage across the line conductors 16, 18 and 20. Under the constant voltage conditions of the line, the positive-sequence network 50 functions to deliver a positive-sequence component of the generator voltage to the frequency compensating means 48 and from thence to the network 46.

The non-linear impedance circuit 60 and the linear impedance circuit 62 are so selected that when the positive-sequence component of the predetermined line voltage is impressed upon the network 46, the circuits 60 and 62 have intersecting impedance characteristics and the voltages across rectifying units 64 and 66 and at the points 65 and 67 are equal and so balanced that a voltage drop does not appear across the control field winding 34.

If the line voltage should increase from the predetermined value, then the positive-sequence component delivered to the network 46 is increased, with the result that the non-linear impedance circuit 60 draws more current than the linear impedance circuit 62 and the output voltages across the rectifying units 64 and 66 are unbalanced. With such an unbalanced condition, the larger potential across the rectifying unit 64 effects a voltage drop across the control-field winding 34 in a direction to produce an action to oppose the excitation of the field windings 30 and 32 to decrease the output of the exciter generator 22 to decrease the excitation of the generator 10 to return the line voltage to the predetermined value.

If the change in the line voltage is a decrease, then the linear impedance circuit 62 draws more current than the non-linear impedance circuit 60 and the network is unbalanced to effect a voltage drop across the control field winding 34 in a direction to produce an action to aid the field windings 30 and 32 to increase the excitation of the exciter generator 22 and thereby effect an increase in the excitation of the generator 10 to maintain the line voltage at its predetermined value.

In many industrial and commercial applications, it is required that a manual control be utilized for a part of the regulating action instead of the automatic regulating operation just described. In such case, the controller 44 is actuated to move segments 36, 38, 40 and 42 to an open circuit position to disconnect the control field winding 34 from the network 46 and to actuate segments 68, 70, 72 and 74 to circuit closing position to connect the control field winding 34 to taps 88 and 94 of the manual control circuit 76 and the input terminals of the rectifying bridge 78 across the secondary windings of transformer 80.

The adjustable tap 88 is moved to a predetermined position whereby the voltage drop across the section of resistor 86 connected between taps 84 and 88 equals the voltage drop across the constant potential device 92 between taps 84 and 94 when the generator 10 is operated to maintain the predetermined line voltage; and, consequently, with the field windings 30 and 32 supplying sufficient excitation for the exciter generator 22 to maintain a predetermined line voltage, the field current in the control-field winding 34 is zero.

In operation, if a reactive load or short circuit is suddenly applied to the generator 10, such loads are accompanied by a transient increase in current flowing in the field winding 14 of generator 10 which, in turn, causes a transient increase in the current flowing in the series-field winding 30 of exciter generator 22. If the transient field currents in the field windings 30 and 14 could be maintained at their initial values reached after a brief substransient interval, steady operation of the generator 10 under the sudden load would be obtained without voltage drop increasing beyond transient reactance drop, and the short-circuit current would be maintained at the transient value providing high current for circuit breaker coordination. The characteristics of the self-excited exciter generator 22 are such that the exciter generator tends to sustain the high transient value of field current, since the transient current in the field winding 30 tends to effect an increase in the voltage output of exciter 22 to sustain the excitation of generator 10 at its transient value.

Now, with the manual control circuit 76 connected to be responsive to changes in load-circuit conditions as described, the load or short circuit suddenly applied effects a decrease in the voltage across load conductors 18 and 20 with the result that the potential drop across the section of resistor 86 between taps 84 and 88 so changes with respect to the potential drop across the constant potential device 92, that the potential at the adjustable tap 88 becomes less negative than the potential at tap 94. Under these conditions, current flows from the adjustable tap 88 through the segment 70, the control field winding 34, and segment 68 to the fixed tap 94 of the manual control circuit 76, to produce an excitation that is cumulative to the excitation effect of windings 30 and 32 to cause a slow drift of the voltage of the exciter generator 22 to a value approaching that necessary to maintain the voltage of generator 10 at the predetermined normal regulated value. This slow drift is in the right direction to correct for the change in voltage of the line. It therefore prevents the voltage dip from materially exceeding the transient reactance drop even if the operator is not in attendance but where the system is connected for manual control. Also, since it at least sustains and actually increases the transient short circuit current, it fulfills the requirements for circuit breaker coordination. The voltage can be adjusted manually to change value, speed the return to normal, or for any other purpose.

Where it is desired to force a quick correction in the voltage output of the exciter generator 22 to maintain the excitation of the generator 10 necessary to maintain the regulated voltage, instead of depending on the slow automatic regulating action of the manual control circuit 76, as described hereinbefore, the quick forcing action may be obtained by moving the adjustable tap 88 along the resistor 86 toward the common terminal 84, whereby the potential at the adjustable tap 88 becomes less and less negative with respect to the potential at the fixed tap 94 with the result that more and more current flows through the control field winding 34 in a direction to produce an excitation that is cumulative to the excitation effect of windings 30 and 32, to quickly increase the excitation of generator 10 to maintain the output therefrom at a predetermined regulated value.

If the change in load is such as to effect an increase in the voltage across conductors 18 and 20 when the manual control circuit 76 is adjusted to maintain the normal predetermined voltage, then the potential at adjustable tap 88 becomes more negative with respect to the potential at tap 94 and a slow automatic regulation is obtained since the current then flows through the control field winding 34 in a direction to produce an action to oppose the excitation of self-energizing windings 30 and 32 to decrease the output from the exciter generator 22, and consequently decrease the output of the generator 10.

As in the previous instance, this slow automatic regulation can be superseded by a manual adjustment of the position of tap 88, the adjustment in this case being in a direction toward the common terminal 82, whereby the potential at tap 88 becomes more and more negative with respect to the potential at tap 94, whereby the forced excitation of the control field winding 34 produces an action to oppose the excitation of the self-energizing field windings 30 and 32 to effect a reduction in the voltage of generator 10 to the predetermined value.

The manual control circuit 76 insures a slow automatic drift of regulation in the right direction to maintain normal regulated generator voltage, and has an excellent settling ability for good stability. Further, the forcing action obtained by adjusting the movable tap 88 is extremely fast.

We claim as our invention:

1. In a regulating system for a dynamo-electric machine disposed to supply a load circuit, in combination, an exciter for supplying the field excitation of the dynamo-electric machine, a control field winding for the exciter disposed to be directionally energized, a manual control circuit consisting of a pair of circuits connected in parallel circuit relation between common taps disposed to be supplied from the load circuit, one of the parallel circuits comprising a resistor having an adjustable tap disposed between the common taps, the other of the parallel circuits comprising a resistor and a constant potential device connected in series-circuit relation through a fixed tap, rectifying means connected between the load circuit and the common taps disposed to supply a unidirectional current to the manual control circuit, the control field winding being connected across the adjustable tap and the fixed tap to be directionally energized in accordance with the potential at said taps, the adjustable tap being disposed for movement to provide a balance in potential at the adjustable tap and the fixed tap for a predetermined condition on the load circuit whereby the energization of the control field winding is zero, the manual control circuit thereby being automatically operative upon a departure from the predetermined condition on the load circuit to directionally energize the control field winding depending upon the direction of the departure, the directional energization automatically tending to increase the output of the exciter when the departure is a decrease to increase the energization of the dynamo-electric machine and thereby tend to restore the predetermined condition on the load circuit, the adjustable tap also being operative to effectively force a directional energization of the control field winding.

2. In a regulating system for a dynamo-electric machine disposed to supply a load circuit, in combination, an exciter for supplying the field excitation of the dynamo-electric machine, a control field winding for the exciter disposed to be directionally energized, a manual control circuit consisting of a pair of circuits connected in parallel circuit relation between common taps disposed to be supplied from the load circuit, one of the parallel circuits consisting of a resistor having an adjustable tap disposed between the common taps, the other of the parallel circuits consisting of a resistor and a dry type rectifier connected in series-circuit relation through a fixed tap, rectifying means connected between the load circuit and the common taps disposed to supply a unidirectional current to the manual control circuit, the control field winding being connected across the adjustable tap and the fixed tap to be directionally energized in accordance with the potential at said taps, the adjustable tap being disposed for movement to provide a balance in potential at the adjustable tap and the fixed tap for a predetermined condition on the load circuit whereby the energization of the control field winding is zero, the manual control circuit thereby being automatically operative upon a departure from the predetermined condition on the load circuit to directionally energize the control field winding depending upon the direction of the departure, the adjustable tap also being operative to effectively force a directional energization of the control field winding.

EDWIN L. HARDER.
ERNEST I. POLLARD.

REFERENCES CITED

The following references are of record in the file of this patent:

FOREIGN PATENTS

| Number | Country | Date |
| --- | --- | --- |
| 467,960 | Great Britain | June 25, 1937 |
| 641,131 | Germany | Jan. 22, 1937 |